March 31, 1931. H. W. PLEISTER 1,798,273

EXPANSION NAIL

Filed Jan. 7, 1930

Henry W. Pleister
INVENTOR

BY Clarkly Johnson
ATTORNEY

Patented Mar. 31, 1931

1,798,273

UNITED STATES PATENT OFFICE

HENRY W. PLEISTER, OF WESTFIELD, NEW JERSEY, ASSIGNOR TO HENRY B. NEWHALL CORPORATION, OF GARWOOD, NEW JERSEY, A CORPORATION OF NEW JERSEY

EXPANSION NAIL

Application filed January 7, 1930. Serial No. 419,057.

My invention relates to expansions and more particularly to a percussion hammer drive expansion nail, for use particularly in steel, brick, stone, concrete, terra cotta or other similar material.

My invention further relates to certain articles of manufacture, combinations, and sub-combinations, and details of construction, all of which will be more fully hereinafter described and pointed out in the claims.

In the drawings, the same reference numerals refer to similar parts in the several figures.

Figure 1:
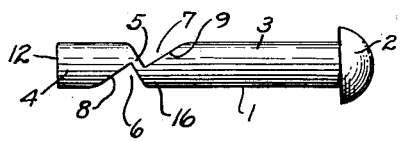
Figure 1 is a side elevation of one form of my improved expansion nail.
Figure 2:
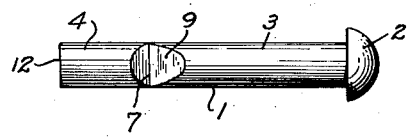
Figure 2 is a plan view.

My invention relates to expansions, and particularly to an integral expanding nail adapted to be used in steel, masonry, or similar material.

I have shown one form of my invention in which 1 is an integral nail having a head 2, a shank 3, an expanding or wedge member 4 connected to the shank 3 by an integral distortable connecting member 5.

Opposite sides of the shank 3 are provided with the groove 6, 7, the co-operating inclined expanding surfaces 8 being on the wedge member 4 on one side of the groove 6, and the opposed inclined expanding surfaces 9 of the shank, being on one side of the groove 7, the two co-operating inclined expanding surfaces 8 and 9 being separated by the distortable connecting member 5. These grooves 6 and 7, may be formed in the nail at the same time that the nail is shaped, or subsequently.

Figure 3:
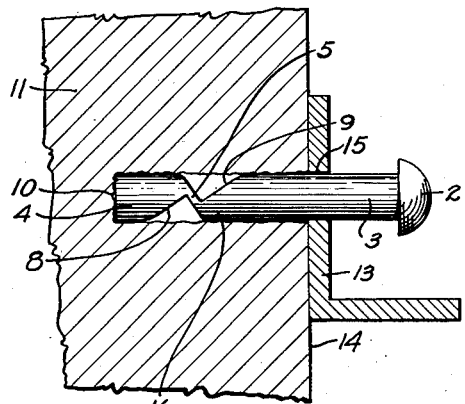
Figure 3 is a vertical section through a support of steel, masonry, or similar material, illustrating the initial position in inserting the nail.

In use a hole 10 of the proper diameter and of a proper depth is formed in the steel, masonry or other material 11, and the nail 1 positioned therein so that after the end 12 of the nail reaches the bottom of the hole 10 there will be a portion of the shank 3 protruding from the hole, as shown in Figure 3.

Figure 4:
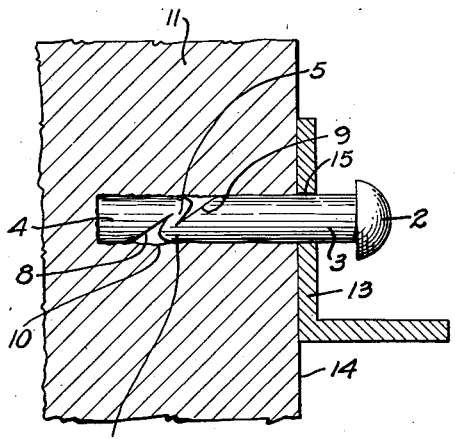
Figure 4 is a vertical section, similar to Figure 3, showing the nail partly driven into the hole.
Figure 6:
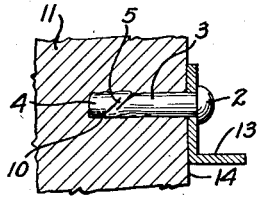
Figure 6 is a view, similar to Figure 5, showing the nail completely driven into the hole, the connecting member being distorted but not broken.
Figure 5:
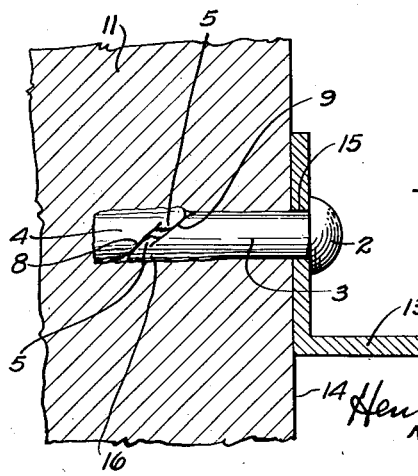
Figure 5 is a view, similar to Figure 4, showing the nail completely driven into the hole, and the connecting member broken.

In this figure the bracket 13 is held to the face 14 of the support 11 by passing the nail 1 through a hole 15 in the bracket. By then hammering with a hammer, or other similar tool, upon the head 2 of the nail, the distortable connecting member 5 is bent, Figure 4. By one or two additional blows of the hammer this integral connecting member is either ruptured, Figure 5, or still further bent, Figure 6, to permit the co-operating inclined expanding surfaces 8 and 9 to co-operate with each other, and force the wedge member 4 radially, as well as the portion 16 of the shank 3, thereby exerting a powerful expansion in the hole and securing the bracket 13, or other work, to the support 11.

I have found in practice that the hole 10 should be drilled with reasonable conformity to the diameter of the shank 3 of the nail, and that the depth of the hole should be gauged to allow the nail, in the position of Figure 3, to project twice its diameter from the work. For example: if a ¼″ diameter nail is used a hole should be drilled that will allow the nail to project a ½″ beyond the work in the position of Figure 3. This would give the proper amount of expansion to insure a rigid bond or grip between the expansion nail and the support.

It is to be understood that the figures of the drawing and the sizes given are merely illustrative and that I am not to be confined to them.

Having thus described this invention in connection with illustrative embodiments thereof, to the details of which I do not desire to be limited, what is claimed as new and what is desired to secure by Letters Patent is set forth in the appended claims.

What I claim is:

1. A new article of manufacture comprising a percussion hammer drive expanding nail provided with a shank having inclined surfaces on opposite sides and an integral distortable connecting member between the inclined surfaces, said connecting member adapted to bend or break when pressure is exerted on the head of the nail thereby permitting the inclined surfaces to co-operate with each other.

2. A new article of manufacture comprising a percussion hammer drive expanding nail provided with a shank having two wedge surfaces and an interposed integral distortable connecting member adapted to be broken by blows on the head of the nail so that the portions thereof slide upon the said wedge surfaces to expand the nail.

3. A new article of manufacture comprising a percussion hammer drive expanding nail provided with a shank having one or more wedge surfaces and an interposed integral distortable connecting member adapted to be distorted between said surfaces by blows on the head of the nail permitting the wedge surface or surfaces to expand the nail radially in opposite directions.

4. A new article of manufacture comprising a percussion hammer drive expanding nail provided with a shank having two wedge surfaces on opposite sides of the shank separated by a distortable integral member which is adapted to be bent or broken by blows on the head of the nail to permit the wedge surfaces to cooperate with each other.

HENRY W. PLEISTER.